H. F. GRAY & F. E. STEVENS.
GAS METER CONNECTING DEVICE.
APPLICATION FILED OCT. 24, 1907.
909,179.
Patented Jan. 12, 1909.
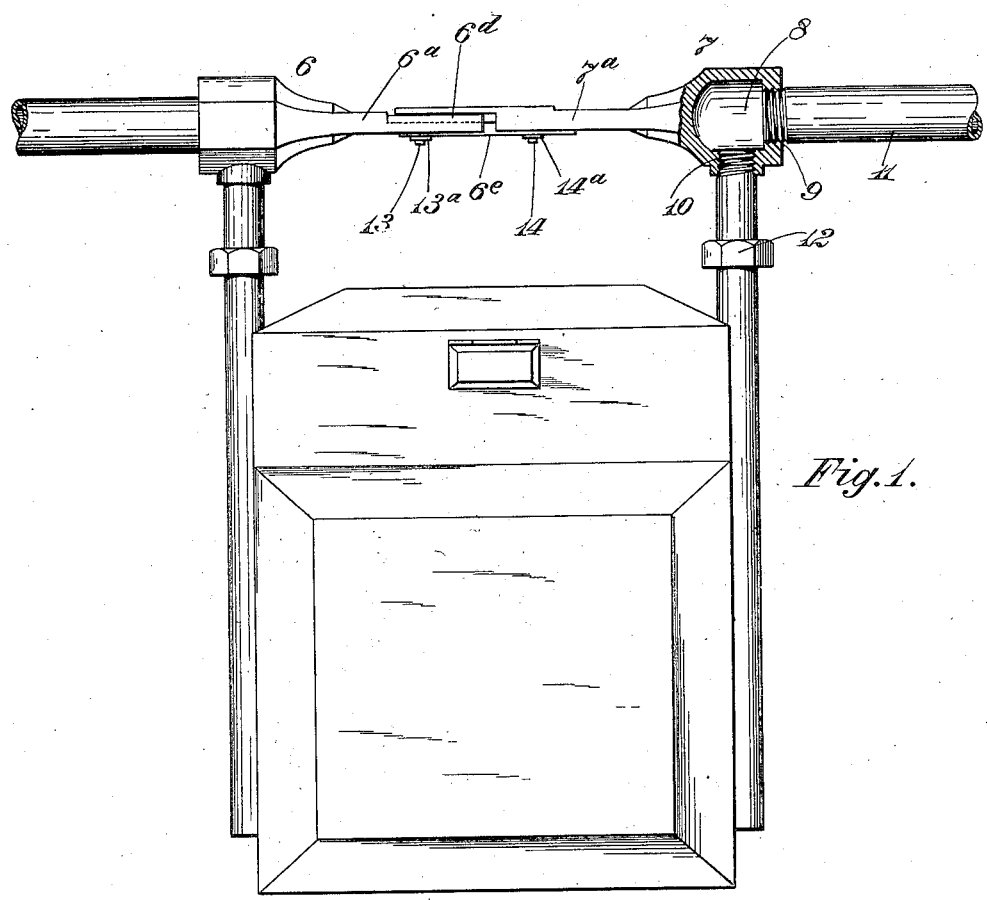
Fig.1.
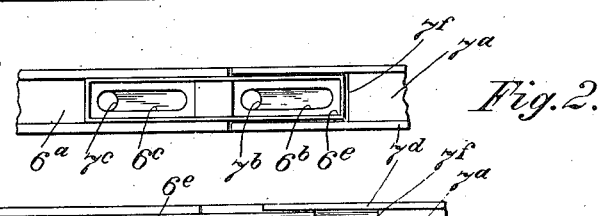
Fig.2.
Fig.3.
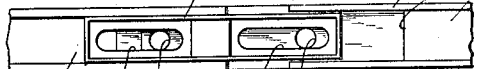
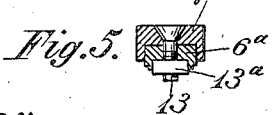
Fig.5.
Fig.4.
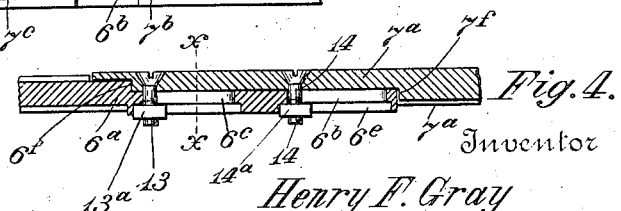
Witnesses
Benj. Finckel
James Strader
Inventor
Henry F. Gray
Frank E. Stevens
by Finckel & Finckel
their Attorneys

UNITED STATES PATENT OFFICE.

HENRY F. GRAY AND FRANK E. STEVENS, OF COLUMBUS, OHIO, ASSIGNORS TO THE STANDARD APPLIANCE COMPANY, OF COLUMBUS, OHIO, A CORPORATION OF OHIO.

GAS-METER-CONNECTING DEVICE.

No. 909,179.      Specification of Letters Patent.      Patented Jan. 12, 1909.

Application filed October 24, 1907. Serial No. 398,870.

*To all whom it may concern:*

Be it known that we, HENRY F. GRAY and FRANK E. STEVENS, citizens of the United States, residing at Columbus, in the county of Franklin and State of Ohio, have invented a certain new and useful Improvement in Gas-Meter-Connecting Devices, of which the following is a specification.

To connect gas meters with the street and house pipes, the latter are often strained to get them into position for effecting the connection, and when the connection is effected the strain of the pipes is transmitted to the meter, rendering it liable to be ruptured.

One of the objects of this invention is to provide improved means for facilitating and cheapening the connection of the street and house pipes with the meter and relieving the strain on the meter.

Other objects will appear from the following specification.

In the accompanying drawing—Figure 1 illustrates our invention as used in connection with a meter; Fig. 2 is a bottom plan view of the parts of the joint in the device closed, with the fastening devices removed; Fig. 3 is a similar view showing the parts somewhat extended; Fig. 4 is a longitudinal vertical sectional view of the parts at the joint including the fastening devices; Fig. 5 is a cross section taken on line $x$—$x$ Fig. 4.

Our meter-connecting device is made up mainly of two parts or castings 6 and 7, each having an enlarged portion provided with a cavity, as seen at 8 in the right hand portion Fig. 1, said portion being threaded as seen at 9 and 10 for connection of the gas pipe proper 11 and the coupling on the meter, as indicated at 12. The exterior of the en40 larged portion at the end of each of the parts 6 and 7 is formed for the reception of a wrench, each part prior to the connection of the parts together being independently operated to turn them onto the ends of the gas pipes.

The part 6, which is at the left hand side in the views Figs. 1 to 4 inclusive, is made with a tongue $6^a$, having slots $6^b$ and $6^c$, the tongue being flanked at each side at the upper side Fig. 1 by flanges, as indicated at $6^d$, near its root. The under side (Fig. 1) of the said tongue is flanged or walled, as indicated at $6^e$, around the slots $6^b$ and $6^c$ to afford means to prevent the nuts from turning. The part 7 is made with a tongue $7^a$ having circular holes $7^b$ and $7^c$ and flanged near its root with flanges as indicated at $7^d$, and is rabbeted at its end to fit between the flanges $6^d$ and lap upon the upper side of the tongue $6^a$. The shoulder $6^f$ or $7^f$ on the tongues $6^a$ and $7^a$ respectively limits the movement of the parts 6 toward each other. The tongues thus constructed adjustably match each other and when the parts are secured together, as by screw bolts 13 and 14 and nuts $13^a$ and $14^a$, they are firmly held together and from flexing in any direction, flexing in one direction being prevented by the engagement of the parts 6 and 7 themselves.

The connecting device thus constructed is nicely adaptable within limits to variations in the size of meters, and in practice after the application of the two parts of the device to the respective ends of the gas pipe, they are slid upon each other until the threads for the attachment of the meter are at just the right points to receive the couplings of the meter. Hence all strain of the pipes proper is borne by the device and not by the meter.

With this construction it will be observed that the customary union in the gas pipe is dispensed with.

What we claim and desire to secure by Letters Patent is:

1. A connecting device for meters, comprising in combination two separate independently-operative parts each having a cavity at one of its ends and provided with threaded openings into said cavity for the reception of a gas pipe and a coupling on the meter, one of said parts provided with a tongue $6^a$ having flanking flanges $6^d$ and walls $6^e$ and the other having a tongue $7^a$ and flanges $7^d$, said tongues having holes and slots, bolts and nuts for securing said tongues together, substantially as and for the purpose set forth.

2. A connecting device for gas meters, comprising two separate parts each having a cavity at one of its ends and provided with threaded openings into said cavity for the reception of a gas pipe and a coupling on the meter, said ends being constructed to receive a wrench, and interengaging lapping tongues integral with said parts, and means for securing said tongues together.

HENRY F. GRAY,
FRANK E. STEVENS.

Witnesses:
BENJAMIN FINCKEL,
ALICE B. COOK.